Figure 1:
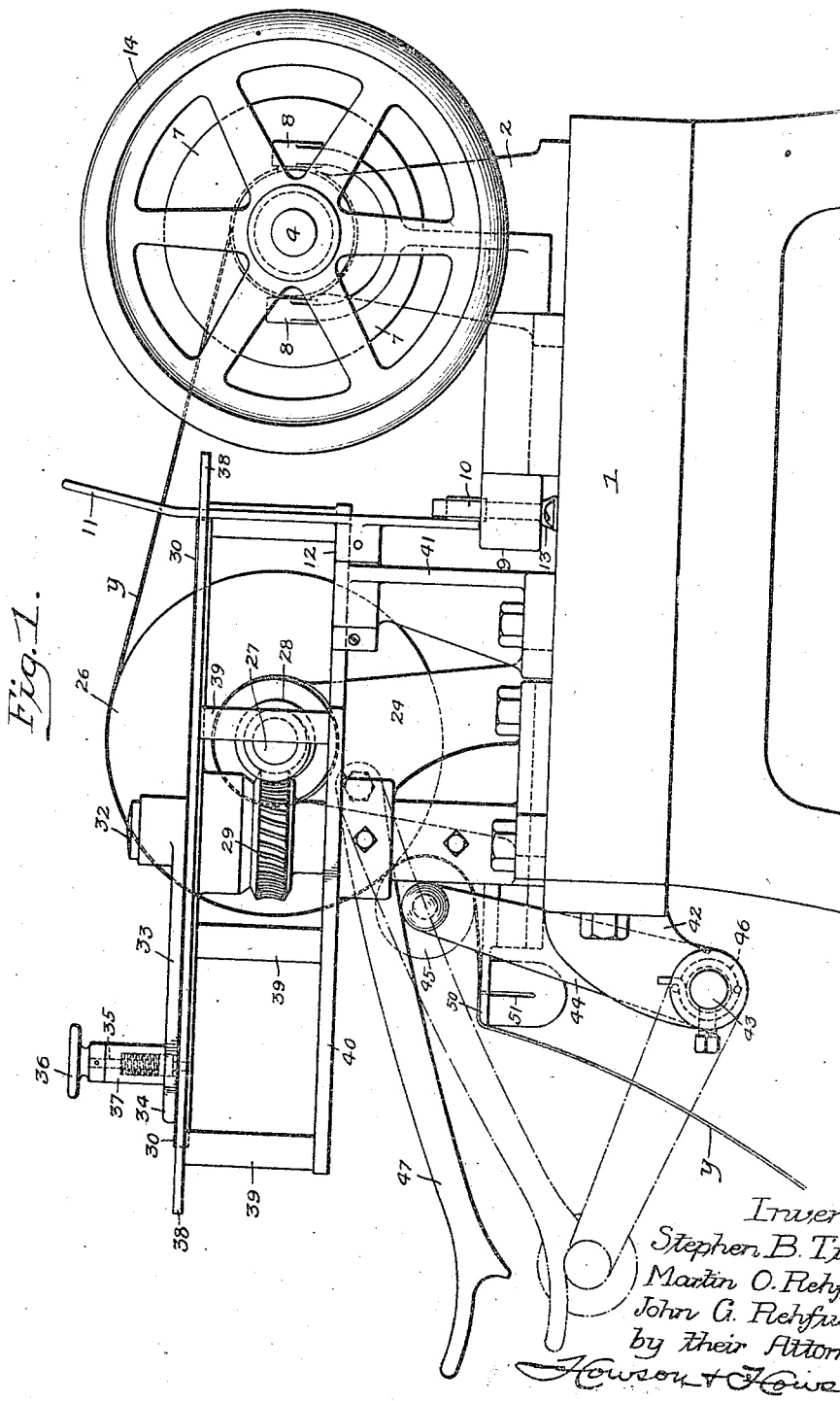

S. B. TILY & M. O. & J. G. REHFUSS
MEASURING MACHINE.
APPLICATION FILED JUNE 2, 1916.

1,293,987.

Patented Feb. 11, 1919.
2 SHEETS—SHEET 1.

Inventors
Stephen B. Tily,
Martin O. Rehfuss,
John G. Rehfuss,
by their Attorneys
Howson & Howson

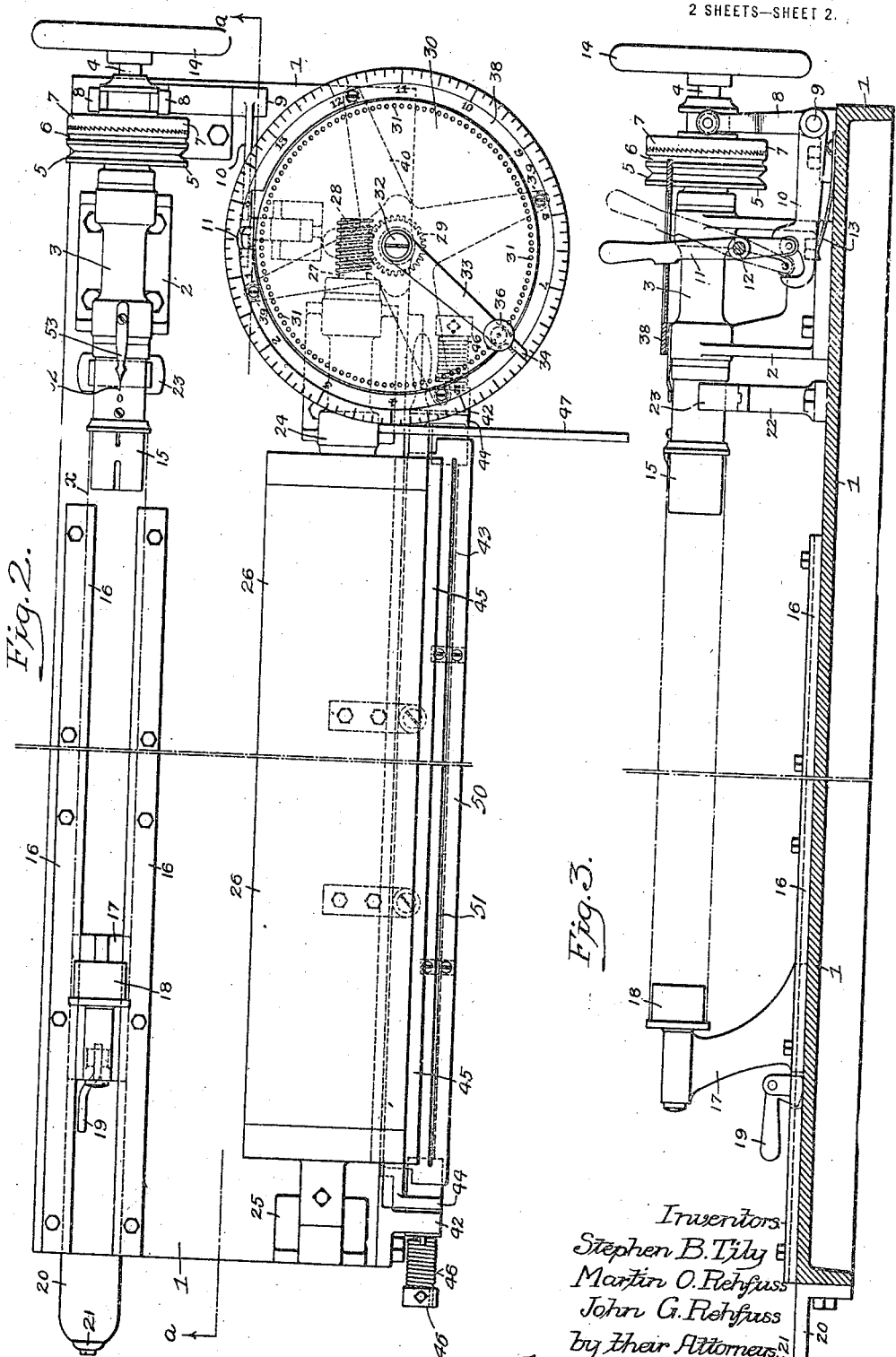

UNITED STATES PATENT OFFICE.

STEPHEN B. TILY, OF BALA, AND MARTIN O. REHFUSS AND JOHN G. REHFUSS, OF PHILADELPHIA, PENNSYLVANIA, ASSIGNORS TO JOHN WANAMAKER, PHILADELPHIA, OF PHILADELPHIA, PENNSYLVANIA, A CORPORATION OF PENNSYLVANIA.

MEASURING-MACHINE.

1,293,987.

Specification of Letters Patent.

Patented Feb. 11, 1919.

Application filed June 2, 1916. Serial No. 101,298.

*To all whom it may concern:*

Be it known that we, STEPHEN B. TILY, MARTIN O. REHFUSS, and JOHN G. REHFUSS, citizens of the United States, I, the said STEPHEN B. TILY being a resident of Bala, Montgomery county, State of Pennsylvania, and we, the said MARTIN O. REHFUSS and JOHN G. REHFUSS being residents of Philadelphia, county of Philadelphia, State of Pennsylvania, have invented Measuring-Machines, of which the following is a specification.

One object of this invention is to provide a simple, substantial and accurate device whereby definite lengths of web or piece material such as cord, wire and particularly fabric, may be measured off from a body of the same and wound in the form of a coil or roll, the invention contemplating novel means for stopping the operation of said device when the desired length has been drawn from the piece.

It is further desired to provide a measuring machine with a manually adjustable device for predetermining or definitely limiting the amount of material to be drawn from a piece of the same, the arrangement of parts being such that after the setting of said device, the machine may be put in operation and caused to automatically stop when the desired length of the goods has been drawn out by the machine.

The invention also contemplates novel and relatively simple means for adjusting the machine to permit of the insertion and removal of the material to be measured.

These objects and other advantageous ends we secure as hereinafter set forth, reference being had to the accompanying drawings, in which, Figure 1 is an end elevation of a measuring machine constructed according to our invention;

Fig. 2 is a plan of the measuring machine, shown in Fig. 1, on a reduced scale, and Fig. 3 is a vertical section on the line *a—a*, Fig. 2.

In the above drawings 1 represents a table or relatively heavy base on which is fixed a standard 2 providing a bearing 3 for a shaft 4. This latter shaft has loosely mounted on it a pulley wheel 5 which is continuously driven from any suitable source of power and has fixed to it one member 6 of a clutch whose second member 7 is fixed to the shaft 4. Said member 7 may be made to slide longitudinally of the shaft by means of a forked arm 8 fixed to a shaft 9 mounted in suitable bearings on the base 1, the branches of said arm entering a groove in the hub of said member 7.

Also fixed to the shaft 9 is a second arm 10 extending practically at right angles to the arm 8 and likewise having its end forked for the reception of one end of a lever 11 pivoted to the standard 2 at 12. This fork at the end of the arm 10 is so formed as to provide a recess for the reception of a roller on the lower end of the lever 11 which in one position locks said arm in a depressed position against the action of a spring 13 and through the shaft 9 and arm 8 holds the clutch member 7 in engagement with the member 6. When moved to a second position, the roller on the lower end of the lever 11 permits the arm 10 to rise under the action of its spring 13 and thereby disconnect the clutch members 6 and 7.

The outer end of the shaft 4 preferably has fixed to it a hand wheel 14 while its opposite end constitutes a mandrel or live center 15 designed to receive one end of a paper or paste-board tube, indicated in dot and dash lines in Fig. 2, for the reception of goods measured off by the machine. The base 1 is provided with a pair of parallel guides 16 for the reception of a slidable standard or tail stock 17 carrying a second mandrel or dead center 18 for supporting the second end of the goods-receiving tube. This standard 17 may be rigidly held to the base 1 in any given position by a lever 19 pivoted to it and provided with an arm having a cam-shaped edge which in one position frictionally engages and holds to the main base structure 1.

To limit the rearward movement of the standard 17 I provide an angle bracket 20 fixed to and projecting from the table 1 adjacent the outer or rear end of the guides 16 and mount on the extremity of this bracket a washer or plate 21 which serves as a stop. In order to stop rotation of the shaft 4 and the mandrel 15 attached thereto as soon as possible after the clutch members 6 and 7 have been disengaged, I provide a standard 22 under said mandrel adjacent the bearing 2 and mount a brake shoe 23 on said standard in frictional engagement with the mandrel.

Supported in suitable bearings provided by standards 24 and 25 carried on the base 1 is an idler roll 26 having its supporting shaft 27 extended at one end for the reception of a worm 28 engaging a worm wheel 29 fixed to a sleeve also having fixed to it a circular plate 30 provided with a series of holes 31 adjacent its edge. Mounted concentrically with the plate 30 and worm wheel 29 is a fixed spindle 32 on which is rotatably mounted an arm 33 terminating in an index finger or pointer 34 and having adjacent its end a pin 35 provided with a manually operable head 36. Said pin is slidably mounted in a bearing or guideway 37 adjacent the arm 33 and is normally depressed by a spring so as to tend to enter and remain in one of the holes 31.

Immediately outside of and surrounding the plate 30 is a ring 38 graduated in yards and fractions thereof, which as shown in Fig. 1 is supported concentric with and in the plane of said plate 30 by a series of posts 39 fixed to a frame 40, carried on standards 41 projecting up from the frame 1. It is noted that the arm 11 is so mounted as to extend through a slot in the ring 38 within the path of movement of the pointer 34 on the arm 33 so as to be movable thereby under certain conditions hereafter noted.

Adjacent opposite ends of the base 1 I fix to the sides thereof a pair of downwardly extending brackets 42 providing bearings for short spindles 43 having arms 44 supporting at their outer ends a swinging tension roll 45. Said roll is at all times forced toward the larger roll 26 by a pair of coil springs suitably mounted on the spindles 43 but it may be held some distance away from said roll by a pivoted arm 47 which projects outwardly from one of the standards 24. The outer end of this arm is slightly concaved or forked to receive one end of the roll 45 when this is swung outwardly on the spindles 43 as an axis.

Immediately adjacent and below the roll 45 when this is in its position nearest the roll 26 I mount a plate 50 provided with a longitudinally extending slot 51 whose length is practically the same as that of said rolls and which is designed for the reception of a knife when it is desired to sever a length of web material lying over it.

As shown in Fig. 2 the mandrel 15 has an index mark 52 and the bearing adjacent said mandrel carries a fixed pointer 53 with which said index mark may be alined.

In constructing the machine, the roll 26 is so mounted with respect to a tube $x$ on the centers 15 and 18 and the roll 45 when this is in the position shown in Fig. 1, that when a length of fabric $y$ is drawn around said rolls 45 and 26 and from thence to the tube $x$, there is a length of exactly one-half yard between a straight line on the surface of the tube $x$ in the line of the pointer 53, and the slot 51 in the plate 50.

Under conditions of use the roll 45 is swung outwardly about the spindles 43 until it enters the fork of the arm 47 which thereafter holds it in its outward position against the action of the springs 46. The fabric or other material from which it is desired to cut a length is then passed under the roll 45, over the roll 26 and is pinned to the tube $x$ with its terminal edge in line with the pointer 53, the index mark 52 of the center 15 having been previously brought into line with said pointer. It is understood that the two centers 15 and 18 have tapering extremities so as to frictionally engage and non-rotatably hold the tube $x$.

The roll 45 is now disengaged from the arm 47 and is allowed to return to the position shown in full lines in Fig. 1, after which the pin 35 is raised out of whatever hole 31 of the disk 30 it happens to lie within and the arm 33 is turned until its pointer or index finger 34 lies with its straight edge coincident with the numeral or division on the ring 38 corresponding to the number of yards of material it is desired to cut off. The pin 35, which has up to this time been held out of engagement with the plate 30 by means of its head 36, is now permitted to enter the hole 31 of said plate lying immediately under it and the lever 11 is thrown into the position shown in Fig. 3, thus forcing down the arm 10 and causing the arm 8 to move the clutch member 7 into engagement with the clutch member 6. Since the pulley 5 is constantly turned from a suitable source of power, the shaft 4 and center 15 with the tube $x$, are now rotated in a clockwise direction.

The fabric $y$ is thereupon wound on said tube, causing the roll 26 to rotate and with it the worm 28 so that the worm wheel 29 and plate 30 are also rotated. Since the arm 33 is fixed to the plate 30 by the pin 35, it is moved therewith in a clockwise direction until just before the pointer 34 on said arm reaches the graduation corresponding to one-half yard, it engages the lever 11 and turns it on its pivot 12 from the full line position shown in Fig. 3 to the position shown in dotted lines. The resulting release of the arm 10 causes the separation of the clutch members 6 and 7 under the action of the spring 13 and stops revolution of the shaft and the tube $x$ after which a knife blade or cutting edge may be run longitudinally through the slot 51 so as to sever the web of fabric at that point. The hand wheel 14 is now turned until the material extending around the idler rolls 45 and 26 is completely wound on the tube $x$, it being obvious that with the machine constructed as above described there would be just six yards of the material on the tube, if the arm 33 was originally placed as shown in Fig. 2. Said tube with the measured length of goods may now be removed by operating the lever 19 and sliding back the tail stock with the center 18. After another tube has been placed on the centers and the roll 45 swung into its outward position, another length of material may be drawn into the machine and fastened to the tube as above described, after which the arm 33 may be again turned on its center or spindle 32 to bring its pointer 34 opposite the numeral or graduation on the ring 38 corresponding to a second length of goods required.

The machine may then be again operated as previously noted, the controlling lever 11 being always so set adjacent the half yard mark of the ring that the centers shall be brought to rest by the time the pointer 34 comes opposite said graduation. Continued revolution of the centers with the tube and the material thereon after the disconnection of the clutch members 6 and 7 is effectually prevented by reason of the constantly exerted braking action of the shoe 23 on the live center.

While we have shown a cutting device in the form of the edges defining the knife slot in the plate 50, obviously any other means may be provided for severing the material in advance of the tension roll without departing from our invention.

We claim:—

1. The combination in a measuring machine of a rotary winding member; an idler roll adjacent thereto; a tension roll mounted to swing toward and from the idler roll on the side thereof distant from the winding member and in position to deflect the material around itself; with a supporting member for said material and a cutting member both mounted to engage said material in advance of the idler roll.

2. The combination in a measuring machine of a rotary winding member; an idler roll; a cutting member mounted in advance of the idler roll; and a tension roll mounted to swing into and out of the space between the cutting member and the idler roll.

3. The combination in a measuring machine of a rotary winding member; an idler roll; a cutting member mounted in advance of the idler roll; a tension roll mounted to swing into and out of the space between the cutting member and the idler roll; with a device for temporarily holding the tension roll in a position distant from the idler roll.

4. The combination in a measuring machine of a rotary winding device; an idler roll; a cutting member; a tension roll operative on the material between the idler roll and the cutting member; pivotally mounted arms supporting said tension roll; and resilient means normally pressing the tension roll toward the idler roll.

5. The combination in a measuring machine of a rotary winding device; an idler roll; a cutting member; a tension roll operative on the material between the idler roll and the cutting member; pivotally mounted arms supporting said tension roll; resilient means normally pressing the tension roll toward the idler roll; with a pivotally mounted arm mounted to engage and hold said tension roll in a position distant from the idler roll against the action of said resilient means.

STEPHEN B. TILY.
MARTIN O. REHFUSS.
JOHN G. REHFUSS.